(12) United States Patent
Tsuchida

(10) Patent No.: US 8,181,622 B2
(45) Date of Patent: May 22, 2012

(54) ENGINE AND PISTON

(76) Inventor: Shuichirou Tsuchida, Fukushima (JP)

( * ) Notice: Subject to any disclaimer, the term of this patent is extended or adjusted under 35 U.S.C. 154(b) by 0 days.

(21) Appl. No.: 12/895,188

(22) Filed: Sep. 30, 2010

(65) Prior Publication Data

US 2011/0048366 A1 Mar. 3, 2011

Related U.S. Application Data

(63) Continuation of application No. PCT/JP2009/000349, filed on Jan. 30, 2009.

(30) Foreign Application Priority Data

Mar. 31, 2008 (JP) ................................. 2008-093289

(51) Int. Cl.
*F02F 3/00* (2006.01)
(52) U.S. Cl. ................ 123/193.6; 123/196 R; 123/193.4
(58) Field of Classification Search .............. 123/73 AA, 123/73 AD, 193.4, 193.6, 196 R
See application file for complete search history.

(56) References Cited

U.S. PATENT DOCUMENTS

| | | | | |
|---|---|---|---|---|
| 2,032,849 | A * | 3/1936 | Nelson | 92/228 |
| 2,197,942 | A * | 4/1940 | Over | 92/160 |
| 2,420,474 | A * | 5/1947 | Graham | 123/193.6 |
| 3,257,997 | A * | 6/1966 | Sheaffer | 123/73 AA |
| 4,576,126 | A * | 3/1986 | Ancheta | 123/193.6 |
| 4,674,399 | A * | 6/1987 | Bruni | 123/193.6 |
| 6,205,962 | B1 * | 3/2001 | Berry, Jr. | 123/193.6 |
| 7,415,961 | B1 * | 8/2008 | Chen et al. | 123/193.6 |

FOREIGN PATENT DOCUMENTS

| | | |
|---|---|---|
| JP | 114563/1973 | 5/1975 |
| JP | 107108/1975 | 2/1977 |
| JP | 3273/1992 | 8/1993 |
| JP | 2007-231887 A | 9/2007 |

OTHER PUBLICATIONS

PCT International Search Report Dated Apr. 7, 2009 issued by the International Searching Authority in a related International Application No. PCT/JP2009/000349 (2 pages).
Office Action (Notice of Reasons for Rejection) issued Jan. 5, 2010 in related Japanese Application No. 2009-529464 (in Japanese) (4 pages).
English Translation of Office Action (Notice of Reasons for Rejection) issued in related Japanese Application No. 2009-529464 (6 pages).
International Preliminary Report on Patentability dated Dec. 13, 2010 issued in related International Application PCT/JP2009/000349 (7 pages).

* cited by examiner

*Primary Examiner* — Noah Kamen
(74) *Attorney, Agent, or Firm* — Robert P. Michal; Lucas & Mercanti, LLP

(57) ABSTRACT

There is provided an engine in which sliding surfaces of a cylinder and a piston do not tend to seize and the ratio of a lubricating oil to a composite fuel can be reduced. There is also provided a piston that allows the lubricating oil to be intentionally supplied to the surface of the piston that slides along the cylinder or a cylinder liner. In an aspect of the present invention, an engine in which an air-fuel mixture containing a lubricating oil is supplied into a combustion chamber includes supply means for supplying the air-fuel mixture to the interface between an inner wall of a cylinder or a cylinder liner and a tubular portion of a piston (portion between piston rings and/or piston ring portion). The supply means is, for example, through holes passing through the tubular portion of the piston and groove portions.

6 Claims, 8 Drawing Sheets

(a)

(b)

(a)

(b)

ENGINE AND PISTON

CROSS-REFERENCE TO RELATED APPLICATION

This is a continuation application of PCT International Application No. PCT/JP2009/000349 filed Jan. 30, 2009, which claims priority of the Japanese Application No. 2008-093289 filed Mar. 31, 2008, the entire disclosure of each of which is incorporated herein by reference.

FIELD OF THE INVENTION

The present invention relates, for example, to an engine and a piston, and particularly to an engine using a composite fuel and a piston.

BACKGROUND OF THE INVENTION

Some widely used mowers, chain saws, and other small-sized machines, which are one type of engine-equipped machine, are equipped with a two-cycle engine that produces power by burning a composite fuel obtained by mixing in advance gasoline or any other suitable fuel with a lubricating oil for lubricating parts (members) of the engine.

In a two-cycle engine of this type, a composite fuel not only produces power when burned but also lubricates members of the engine (see Patent Document 1, for example).

In a two-cycle engine, there is always a need to reduce the ratio of the lubricating oil to the composite fuel. In a conventional two-cycle engine, however, reducing the amount of lubricating oil disadvantageously leads to insufficient lubrication of sliding surfaces of a cylinder or a cylinder liner and a piston and peripheral members thereof, causing the piston and the peripheral members thereof, which make reciprocating motion in the cylinder or the cylinder liner, to seize.

The problem described above is not limited to a two-cycle engine having a structure using a composite fuel obtained by mixing a fuel with a lubricating oil in advance. For example, in a two-cycle engine in which a fuel and a lubricating oil are separately supplied to a crankcase, the problem described above similarly occurs as long as the engine is configured to use an air-fuel mixture obtained by mixing the fuel with the lubricating oil to produce power and lubricate parts of the engine.

Patent Document 1
 Japanese Patent Laid-Open No. 2007-231887

SUMMARY OF THE INVENTION

Problems to be Solved by the Invention

Consider now a specific circumstance of a four-cycle engine. When the inner wall of a cylinder liner in an engine wears by 0.5 mm, the gap between facing surfaces of a piston ring increases by 1.57 mm from the value before the inner wall of the cylinder liner wears, provided that the piston ring does not wear. In an actual case, the inner wall of the cylinder liner wore by 0.75 mm, and the gap between the facing surfaces of the piston ring increased by 2.355 mm from the value before the inner wall of the cylinder liner wore. The cylinder liner and peripheral members thereof further wear as the engine keeps operating, resulting in increased consumption of engine oil and decrease in power (torque, in particular). When the piston ring also wears, the gap between the facing surfaces thereof further increases, and high-temperature, high-pressure combustion gas flows into the crankcase through the enlarged gap of the piston ring, causing the engine oil to degrade and sludge (the engine oil becomes thick and hence lacks fluidity due to high temperature and soot resulting from unburned fuel). The engine oil exposed to high temperature and high pressure becomes a large amount of atomized oil, which passes through the enlarged gap between the facing surfaces of the piston ring when the piston makes reciprocating motion, and the engine oil in the crankcase also flows into the combustion chamber and is burned and discharged along with an increased amount of blow-by gas. The piston in an engine typically uses two compression rings for receiving compressive force and combustion gas, and the gap between the facing surfaces of one of the compression rings is angularly shifted by 180 degrees from that of the other in order to minimize the amount of blow-by gas. When the gap between the facing surfaces increases, the combustion gas tends to blow by along the shortest distance, causing the distance from gap between the facing surfaces of one of the compression rings to the gap between the facing surfaces of the other to decrease gradually. As a result, the combustion gas tends to flow into the crankcase, resulting in quick consumption of the engine oil, causing the engine oil to sludge, resulting in decrease in power, increase in fuel consumption, and other disadvantages. Slight wear thus accelerates the vicious circle described above. Wear of the cylinder liner and the peripheral members thereof is a primary cause of destruction of the engine.

The present invention has been made in view of the circumstances described above. An object of the present invention is to provide an engine in which seizure unlikely occurs between a cylinder or a cylinder liner and a piston and peripheral members thereof and the ratio of a lubricating oil to a composite fuel can be reduced. Another object of the present invention is to provide a piston that allows the lubricating oil to be intentionally supplied to sliding surfaces of the piston and the cylinder or the cylinder liner.

Means for Solving the Problems

A first aspect of the present invention for solving the problems described above is an engine in which an air-fuel mixture containing a lubricating oil is supplied into a combustion chamber, the engine including supply means for supplying the air-fuel mixture to an interface between an inner wall of a cylinder or a cylinder liner and a tubular portion of a piston and a piston ring. In particular, a two-cycle engine in which an air-fuel mixture containing a lubricating oil is supplied to a combustion chamber, the two-cycle engine including supply means for supplying the air-fuel mixture to an interface between an inner wall of a cylinder or a cylinder liner and a tubular portion of a piston, also falls within the scope of the first aspect of the present invention. In the following description, any apparatus called an engine similarly includes a two-cycle engine and a four-cycle engine.

A composite fuel used herein refers to a mixture obtained by mixing a fuel (such as gasoline) with a lubricating oil (such as a two-cycle oil) in advance so that the fuel is used not only as a drive source but also for lubrication. It is noted that the composite ratio of the fuel to the lubricating oil is not limited to a specific value.

The lubricating oil used herein refers to an oil that can be used to prevent degradation in performance of the engine due to seizure and wear caused by increased temperatures resulting from a crankshaft rotating at high speed in the engine and friction between the tubular portion of the piston moving upward and downward and the inner wall of the cylinder with which the piston is substantially in contact. An engine oil is also one type of lubricating oil, and the type of lubricating oil is not limited to a specific type but may be any type of lubricating oil that serves to prevent the degradation in performance of the engine due to wear.

The supply means used herein provides the air-fuel mixture to a rotating shaft of the crankshaft, the interface between the inner wall of the cylinder or the cylinder liner and the tubular portion of the piston (hereinafter also referred to as "sliding surfaces"), and other members. Examples of the supply means include a through hole that passes through the side surface of the piston and forms a path through which the air-fuel mixture is discharged from the inside of the piston to the sliding surfaces, and a groove portion provided in the outer side surface of the tubular portion of the piston and having a function of holding the air-fuel mixture. The shapes and the dimensions of the through hole and the groove are not limited to specific ones and may be any shapes and dimensions that allow the air-fuel mixture to flow into the through hole and the groove in an optimal manner and hold an appropriate amount of air-fuel mixture that does not reduce the efficiency at which the piston is driven. Further, since a piston used in an internal combustion engine, such as a gasoline engine and a diesel engine, typically has a hollow cylindrical shape, a through hole or a groove can be formed by machining the side wall of the piston (the thickness of the side wall is not limited to a specific value) by using a drilling machine or a cutting tool.

In the first aspect, the supply means intentionally supplies the air-fuel mixture containing a lubricating oil to the interface between the inner wall of the cylinder or the cylinder liner and the tubular portion of the piston and peripheral members thereof. The sliding surfaces of the cylinder or the cylinder liner and the piston and peripheral members thereof are thus lubricated in a satisfactory manner, whereby seizure between the cylinder or the cylinder liner and the piston and peripheral members thereof can be suppressed.

That is, since the supply means in the above aspect of the present application is provided besides the fuel itself providing lubrication by mixing a fuel with a lubricating oil for preventing seizure and wear, the action of the supply means driven by the piston allows the air-fuel mixture to consequently spread over the sliding surfaces, whereby the air-fuel mixture is always intentionally supplied during the operation and an oil film can be formed on the sliding surfaces. The thus formed oil film works as a lubricating oil and reduces friction between and wear of the sliding surfaces of the cylinder or the cylinder liner and the piston and peripheral members thereof.

A second aspect of the present invention is the engine according to the first aspect in which the supply means is through holes that pass through the tubular portion of the piston.

Each of the through holes used herein is a hole passing through the wall of the piston, and the diameter and the shape of the through hole are not limited to specific ones (for example, circular, elliptical, or rectangular, or straight or tapered (for example, including a shape whose diameter gradually decreases from inside to outside), or straight or stepped) and the number of and the spacings between through holes are not limited to specific values. The through holes are, however, preferably not inclined or tapered but disposed at substantially equal spacings. On the other hand, the position where each of the through holes is drilled is not limited to a specific position but is preferably drilled in a position that does not overlap with the path extending from any of an exhaust port, a scavenge port, and an intake port.

In detail, providing a through hole in a groove into which a piston ring is inserted (hereinafter also referred to as a "ring groove portion") is not preferred because it may adversely affect the strength of the material of the portion around the through hole and cause leakage of compressed gas, resulting in difficulty starting the engine. Further, since it is very difficult and expensive in terms of manufacturing technique to provide a through hole in such a way that it extends from the lower surface of the ring groove portion in an inclined direction, providing a through hole in a piston having a small diameter, in particular, is extremely difficult and wastes a large amount of money and time. It is not preferable from the viewpoint of instantly spreading the largest possible amount of air-fuel mixture and forming an oil film. Further, providing a plurality of through holes in predetermined positions is more preferable than providing a single through hole in a predetermined position. When a single through hole is provided, to allow the lubricating oil having emerged out of the hole to spread over a substantially horizontal surface, the lubricating oil needs to travel the distance corresponding to approximately one-half the circumference of a horizontal cross section of the cylinder, and the size of the hole needs to be large enough not to cause insufficiency of the air-fuel mixture supplied to the sliding surfaces. In this case, however, the strength of the piston could be insufficient when the diameter of the hole is greater than a certain value. To achieve a desired advantageous effect, it is necessary to provide a through hole having an appropriate diameter and shape or in some cases provide an appropriate number of through holes at appropriate spacings.

On the other hand, the through holes can be machined by using a predetermined manufacturing method, in detail, by drilling and end milling using a drilling machine and a milling machine, punching using laser processing or press working, or a combination thereof. Further, the step of forming the through holes according to any of the manufacturing methods described above may be carried out at any timing in a procedure of manufacturing a two-cycle engine or a piston, but preferably at a timing that allows optimal lead time and yield to be achieved.

In the second aspect, the through holes provided in the piston allow the composite fuel to be supplied from the inside of the piston through the through holes to the inner wall of the cylinder or the cylinder liner. Therefore, seizure between the sliding surfaces of the cylinder or the cylinder liner and the piston and peripheral members thereof can be reliably suppressed in a simple configuration.

Further, since a through hole is a simply configured component, and a method for manufacturing a through hole is not complicated, a piston with through holes can be manufactured only by adding a single step of machining through holes to a procedure of manufacturing a conventional two-cycle engine or piston. Therefore, the manufacturing cost and the energy consumption in the manufacturing procedure can be reduced.

A third aspect of the present invention is the engine according to the second aspect in which each of the through holes is provided in a position which faces the inner wall of the cylinder or the cylinder liner but where an exhaust port through which combustion gas produced in the combustion chamber is exhausted is not present.

The exhaust port used herein is an exhaust outlet through which combustion gas produced in the combustion chamber in a two-cycle engine is released into the atmosphere and has a predetermined aperture diameter. If a through hole is provided in a position where it overlaps with the exhaust outlet, the air-fuel mixture before combustion in the crankcase could be unintendedly discharged through the through hole and the exhaust port. In this case, the air-fuel mixture to be also used as a lubricating oil is wasted. It is therefore necessary to provide each of the through holes in a position where it does not overlap with the exhaust port, that is, in a position which faces the inner wall of the cylinder or the cylinder liner but where the exhaust port is not present.

In the third aspect, since each of the through holes is provided in a position which faces the inner wall of the cylinder or the cylinder liner but where the exhaust port is not present, no unburned air-fuel mixture will be directly discharged through the through hole to the exhaust port when the piston slides along the inner wall of the cylinder or the cylinder liner. Therefore, the air-fuel mixture will not be wasted but will be efficiently supplied to the sliding surfaces.

A fourth aspect of the present invention is the engine according to the third aspect in which each of the through holes is provided in a position which faces the inner wall of the cylinder or the cylinder liner but where a port through which the air-fuel mixture flows into the cylinder or the cylinder liner is not present.

The port through which the air-fuel mixture flows into the crankcase and/or the port through which the air-fuel mixture is transported into the combustion chamber used herein is an intake port through which the air-fuel mixture flow into the crankcase and/or a scavenge port through which the air-fuel mixture (mixture obtained by mixing atomized composite fuel with air) in the crankcase is supplied into the combustion chamber. If any of the through holes is provided in a position where it overlaps with the intake port and/or the scavenge port, the air-fuel mixture before combustion in the crankcase could be discharged through the through hole and the intake port and/or the scavenge port. In this case, the composite fuel to be also used as a lubricating oil is wasted. It is therefore necessary to provide each of the through holes in a position where it does not overlap with the intake port and/or the scavenge port, that is, in a position which faces the inner wall of the cylinder or the cylinder liner but where these ports are not present.

The fourth aspect reliably prevents gas leakage in which the air-fuel mixture leaks through the ports described above.

A fifth aspect of the present invention is a piston of an engine in which an air-fuel mixture containing a lubricating oil is supplied into a combustion chamber, the piston including supply paths through which the air-fuel mixture is supplied to the interface between the piston ring and an inner wall of a cylinder or a cylinder liner.

Each of the supply paths used herein is conceptually a member having the same configuration as that of the supply means described above and refers to a flow path through which the air-fuel mixture is supplied.

In the fifth aspect, the supply paths allow the air-fuel mixture containing a lubricating oil to be intentionally supplied to the interface between the piston and the inner wall of the cylinder or the cylinder liner.

That is, besides the fuel itself providing lubrication by mixing a fuel with a lubricating oil for preventing seizure and wear, further providing the supply paths allows the air-fuel mixture to automatically spread over the sliding surfaces because the air-fuel mixture is compressed when the piston is driven and moved toward the bottom dead center. As a result, the air-fuel mixture is always intentionally supplied during the operation, and an oil film can be reliably formed on the sliding surfaces.

A sixth aspect of the present invention is the piston according to the fifth aspect in which the supply paths are through holes that pass through a tubular portion.

Each of the through holes is a hole passing through the wall of the piston, and the diameter and the shape of the through hole are not limited to specific ones (for example, circular, elliptical, or rectangular, or straight or tapered (for example, including a shape whose diameter gradually decreases from inside to outside), or straight or stepped) and the number of and the spacings between through holes are not limited to specific values. The through holes are, however, preferably not inclined or tapered but disposed at substantially equal spacings. On the other hand, the position where each of the through holes is drilled is not limited to a specific position but is preferably drilled in a position that does not overlap with the path extending from any of an exhaust port, a scavenge port, and an intake port.

In the sixth aspect, the presence of the through holes allows the air-fuel mixture to be automatically and intentionally supplied from the inside of the piston toward the surface of the piston that slides along the cylinder or the cylinder liner when the piston is driven.

A seventh aspect of the present invention is the piston according to any of the first to sixth aspects in which grooves are formed in the tubular portion, each of the grooves extending from the opening of the corresponding through hole that is located on the inner wall side of the cylinder or the cylinder liner toward a piston ring and/or a piston ring portion.

Each of the groove portions used herein is a recess or a groove provided in the outer side surface of the piston and having a predetermined width and a predetermined length (ranging from several millimeters to the length of the piston). The locations where the groove portions are disposed are not limited to specific locations, and the width and the length thereof are not limited to specific values (for example, each of the groove portions may range from the uppermost portion to the lowermost portion of the tubular portion). Each of the groove portions preferably extends from the corresponding through hole toward the top dead center and directly connected to a groove into which a piston ring is inserted. The depth of the groove portion is not limited to a specific value but is preferably shallower (smaller) than the depth of the groove into which the piston ring is inserted. Specifically, when the depth of the groove into which the piston ring is inserted in a piston having a small diameter ranges from 1.5 to 1.6 mm, for example, the depth of the groove portion is preferably smaller than 1 mm, more preferably ranges from approximately 0.5 to 0.8 mm. The reason for this is that it is preferable to minimize the area of the groove portion with which the piston ring does not come into contact and maximize the area of the lower surface of the groove with which the piston ring is in contact. The width of the groove portion is preferably equal to the diameter of the through hole in the surface of the piston. Further, the number of groove portions is not limited to a specific value, but the groove portion is preferably provided for each of the through holes between the through hole and the piston ring portion and between the piston ring portion and another piston ring portion.

The groove portions can be machined by using a predetermined manufacturing method, in detail, by drilling and end milling using a drilling machine and a milling machine, laser processing or press working, or a combination thereof. Further, the step of forming the groove portions according to any of the manufacturing methods described above may be carried out at any timing in a procedure of manufacturing a two-cycle engine or a piston, but preferably at a timing that allows optimal lead time and yield to be achieved. In the above description, the term "piston ring" refers to the piston ring itself, and the term "piston ring portion" refers to the combination of the piston ring and the groove from which the piston ring is removed.

In the eighth aspect, since the air-fuel mixture to be supplied through the through holes to the inner wall of the cylinder or the cylinder liner is guided through the groove portions to the piston ring and the piston ring portion, the air-fuel mixture can be supplied to an area wider than the sliding surface of the piston. Therefore, the sliding surfaces of the cylinder or the cylinder liner and the piston and peripheral members thereof can be reliably lubricated and friction between the sliding surfaces can be reliably reduced.

That is, since the air-fuel mixture supplied from the inside of the piston through the through holes spreads over (also expressed as "sweeps over" or "wets over") the sliding surfaces when the piston is driven (using the fact that the air-fuel mixture is compressed when the piston moves toward the bottom dead center), not only is the oil component, even if the content thereof is low, contained in the air-fuel mixture effectively supplied and an oil film can be formed but also (extra) air-fuel mixture that has not spread over is held in the groove portions. Therefore, the thus held air-fuel mixture can be supplied to the sliding surfaces at all times. Further, the air-fuel mixture can spread over the ring groove portion because the piston is driven.

Advantages of the Invention

In the two-cycle engine of the present invention, the supply means intentionally supplies an air-fuel mixture containing a lubricating oil to the interface between the inner wall of the cylinder or the cylinder liner and the tubular portion of the piston and peripheral members thereof. As a result, the sliding surfaces of the cylinder or the cylinder liner and the piston and peripheral members thereof are lubricated in a satisfactory manner, and seizure between the sliding surfaces of the cylinder or the cylinder liner and the piston and peripheral members thereof is suppressed. The present invention can be implemented in a conventional two-cycle engine only by machining a piston or using a machined piston without any other change (as an exception, the advantageous effect of the present invention may not be provided when a connecting rod bearing is a sealed bearing (or a bearing similar to a sealed bearing) employed in some models or when the distance between the ports in the cylinder is extremely small).

That is, when the supply means is through holes passing through the side surface of the piston, the air-fuel mixture with which the engine is filled is discharged from the inside of the piston outward to form an oil film on the sliding surfaces. Therefore, the lubricating oil contained in the air-fuel mixture assists lubrication, allows the piston to be continuously driven, and prevents seizure and wear between the sliding surfaces.

Further, seizure and wear between the sliding surfaces can be more reliably and efficiently suppressed by providing each through hole in a position that does not face the exhaust port, the scavenge port, or the intake port prevents so that the air-fuel mixture to be supplied to the sliding surfaces through the through hole does not leak through the ports described above.

Further, groove portions can be provided as the supply means in the outer side surface of the tubular portion of the piston. In particular, when each of the groove portions is disposed between the corresponding through hole and the piston ring portion and between the piston rings (in such a way that the groove portion is directly connected to the through hole) so that the groove portion is directly connected to the ring groove portions, the air-fuel mixture stays in the groove portion or (extra) air-fuel mixture that has not spread over the sliding surfaces can be held in the groove portion.

That is, since the air-fuel mixture supplied from the space in the piston through the through holes toward the outer wall of the tubular portion of the piston is guided through the groove portions upward (toward the combustion chamber), a wider range of sliding surfaces is lubricated. Further, since the air-fuel mixture is guided through the groove portions to an area above the through holes (on the combustion chamber side), the period during which the air-fuel mixture is held on the sliding surfaces (period from the time when the air-fuel mixture is supplied to the sliding surfaces to the time when the air-fuel mixture falls downward (toward the crankcase)) is longer than the period in a case where only the through holes are provided. In other words, the air-fuel mixture supplied through the through holes is held on the sliding surfaces of the cylinder or the cylinder liner and the piston for a longer period for lubrication. When combustion occurs in the combustion chamber and the piston descends (toward the crankcase) and discharges exhaust gas through the exhaust port, the pressure of the exhaust gas no longer acts from the inside of the piston toward the piston ring, and the piston ring having been in contact with the lower surface of the ring groove portion under the pressure of the exhaust gas moves to (comes into contact with) the upper surface of the groove as the piston descends (because the exhaust gas is discharged through the exhaust port and no gas pressure acts on the piston ring). As a result, a gap is created at the lower surface of the ring groove portion, and the air-fuel mixture is supplied to the ring groove portion through the groove portions. The air-fuel mixture can therefore be reliably supplied to the sliding surfaces in a significantly efficient manner without decrease in the speed of the piston and efficiency at which the piston is driven. Further, since the facing surfaces of the piston ring in the two-cycle engine are located at each of the ports, providing the through holes and the groove portions extending therefrom toward the bottom dead center allows the air-fuel mixture containing an oil component to readily spread over with the aid of the facing surfaces of the piston ring and keep spreading.

Further, in the two-cycle engine of the present invention, the sliding surfaces of the cylinder or the cylinder liner and the piston and peripheral members thereof do not tend to seize even when the ratio of the lubricating oil to the composite fuel is reduced because the air-fuel mixture is intentionally supplied to the sliding surfaces. The ratio of the lubricating oil to the composite fuel can therefore be reduced.

That is, providing the through holes and/or the groove portions in consideration of their positions prevents seizure and wear between the sliding surfaces even when the composite fuel has a composite ratio much higher than that of a conventional composite fuel (specifically, including a fuel-to-lubricating oil ratio ranging from approximately 20:1 to 25:1). If the composite ratio is not observed in an exact sense in related art, seizure and wear occur, which leads to breakage of the engine. It is therefore strictly necessary in related art to use utmost caution to production of a composite fuel. Since neglecting a specified procedure leads to failure or other malfunctions, increase in cost and management burden is inevitable in related art. Further, since the quality of gasoline and oil, of which a composite fuel is made, varies (specifically, the price of a two-cycle oil per liter ranges from high to low prices, and gasoline varies from a regular grade to a high-octane grade), it is therefore necessary to use caution with the quality. In the present application, however, no seizure or wear will occur between the sliding surfaces irrespective of the quality of gasoline and oil even when the ratio of gasoline to a two-cycle oil is 100:1. Therefore, the cost of a composite fuel can be suppressed and the amount of management burden can be reduced. Further, the two-cycle oil will not be consumed in large quantity but can be used in a most effective manner. A commercially available, inexpensive two-cycle oil can be used, and the composite ratio of gasoline to a two-cycle oil can be continuously changed from approximately 20:1 to approximately 100:1.

Further, in general, a lubricating oil contains a variety of additives for enhancing lubrication performance, and in a two-cycle engine having a conventional configuration, a relatively large amount of toxic exhaust gas is produced when a lubricating oil of this type is burned. According to the present application, however, since the composite ratio is significantly low, the amount of lubricating oil to be burned is also small. The amount of produced exhaust gas toxic to humans and environments can therefore be reduced, whereby deleterious effects on the environment can be minimized.

Further, according to the present application, since the proportion of the lubricating oil is low, the amount of oil drooling, in which oil attaches to the exhaust outlet through which exhaust gas flows, will not accumulate, whereby the exhaust process can be carried out in an efficient manner (when a large amount of two-cycle oil is contained in the air-fuel mixture, complete combustion is not achieved, but the oil component becomes sticky soot, which runs out of the exhaust outlet). That is, since the purity of gasoline is high and the exhaust gas contains a small amount of impurities, oil drooling and other impurity accumulation will not occur at the exhaust outlet or the amount thereof is minimized. Therefore, since the exhaust process is carried out in an efficient manner, the intake efficiency at which a composite fuel is sucked into the crankcase is improved. The engine efficiency is also generally improved.

Moreover, according to the present application, since the proportion of a lubricating oil is low, even when a conventional, typically commercially available lubricating oil is used, an event called "covering" in which carbon produced in a combustion process attaches to an ignition plus unlikely occurs, and it is possible to prevent situations in which carbon accumulated on a muffler, through which the combustion gas is exhausted, causes the speed of the engine not to increase or the engine to malfunction (although an instruction manual issued by a certain manufacturer states "Disassemble the muffler every 100 hours of driving and remove carbon," implementing the present invention saves the user the inconvenience described above and reduces the maintenance period).

Further, according to the present application, even if the amount of two-cycle oil in a composite fuel is accidentally smaller than that having been used, seizure or wear will not occur.

Each of the through holes and the groove portions according to the present application has a simple configuration and does not need a complicated manufacturing method but only requires an extra step of machining the through holes and the groove portions added to a conventional procedure of manufacturing a two-cycle engine, and the cost of manufacturing the through holes and the groove portions is low. Therefore, the energy consumption in the manufacturing procedure can also be reduced.

Further, in the piston of the present invention, the supply paths can intentionally supply an air-fuel mixture containing a lubricating oil to the sliding surface of the piston.

That is, the same advantageous effect provided by the supply means according to the present application in the two-cycle engine described above can be provided only by changing the piston in such a way that it has supply paths including through holes and/or groove portions and capable of supplying an air-fuel mixture to the sliding surfaces.

DETAILED DESCRIPTION OF THE INVENTION

The best mode for carrying out the present invention will be described below with reference to the drawings. In the following section, the portion necessary to achieve the object of the present invention will be diagrammatically described, and the description of that portion of the present invention will be limited to necessary portions. On the other hand, the portion that will not be described can be achieved by known technologies.

Figure 1A:
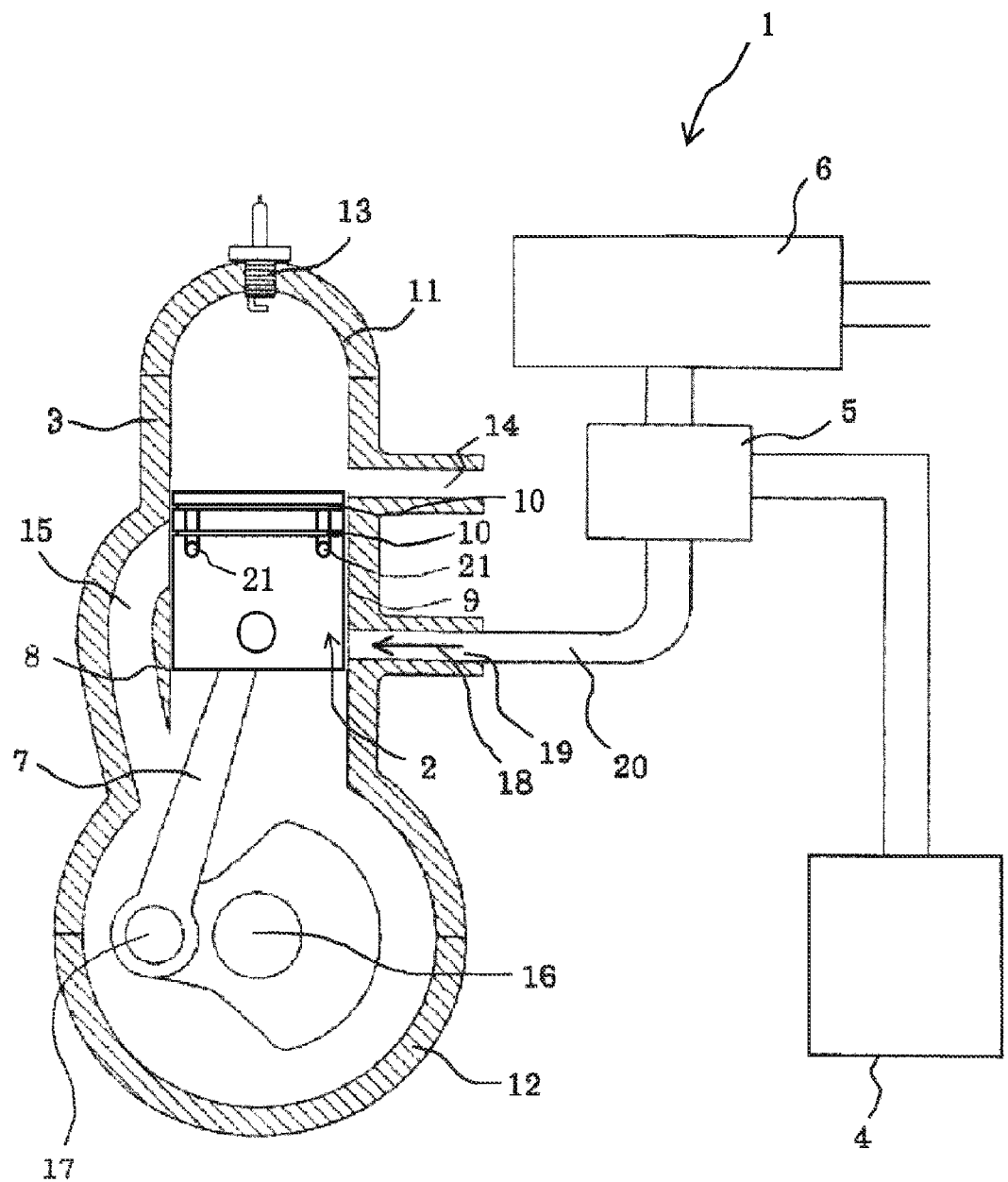
FIG. 1A is a schematic diagram of a two-cycle engine according to a first embodiment of the present invention.
Figure 1B:
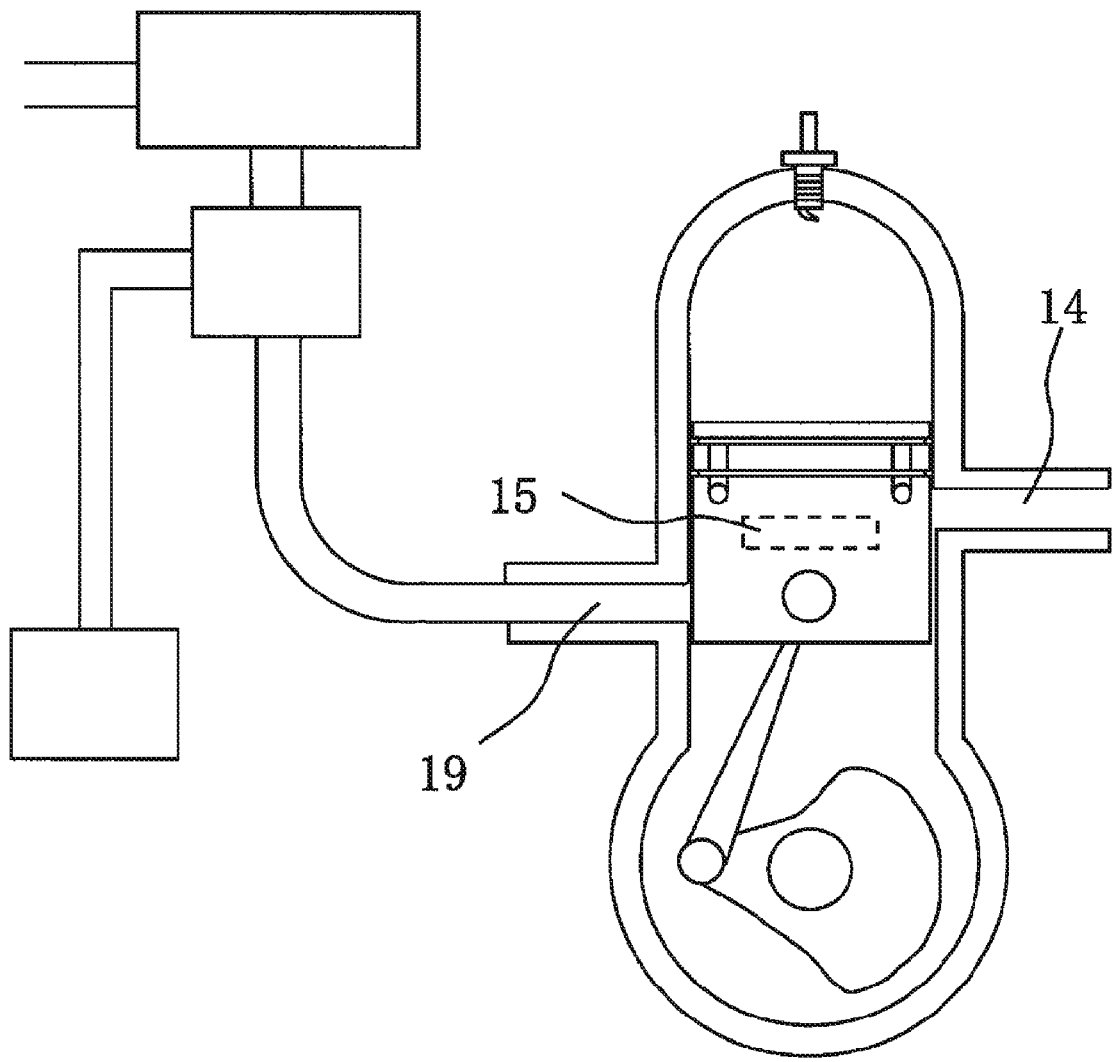
FIG. 1B is a schematic diagram of another two-cycle engine according to the first embodiment of the present invention.

FIGS. 1A and 1B are schematic diagrams of two-cycle engines according to the present embodiment. The two-cycle engine shown in FIG. 1A and the two-cycle engine shown in FIG. 1B are the same in terms of functionality and operation principle but differ from each other only in that the positions and orientations of an exhaust port 14, a scavenge port 15, and an intake port 19. Portions present in both the engines will therefore be described only in the description of one of them and will not be described in the description of the other.

As shown in FIG. 1A, a two-cycle engine 1 of the present embodiment at least includes a piston 2, a cylinder body 3 that accommodates the piston 2, a fuel tank 4 that stores a composite fuel, a carburetor 5 that atomizes the composite fuel, and an air cleaner 6 that sucks outside air. The composite fuel is produced by an operator who mixes gasoline or any other suitable fuel with a predetermined proportion of lubricating oil for lubricating members of the engine. FIG. 1A diagrammatically shows components and combinations thereof for ease of understanding of the outline of the present application. FIG. 1A therefore shows, for example, the exhaust port 14, the scavenge port 15, and the intake port 19 as if they were present in a single cross section, but they may not be present in practice in a single cross section. For example, the exhaust port 14 and the intake port 19 may be shifted from each other by 180 degrees in a transverse plane (in the circumferential direction), and the exhaust port 14 and the scavenge port 15 may be shifted from each other by approximately 90 degrees in a transverse plane (in the circumferential direction). These configurations are all fall within the embodiment of the present application. FIG. 1B is a cross-sectional view of a two-cycle engine 1 of the present embodiment according to another aspect in which the exhaust port 14, the scavenge port 15, and the intake port 19 are arranged differently, that is, the exhaust port 14 and the intake port 19 are shifted from each other by approximately 180 degrees in a transverse plane (in the circumferential direction), and the exhaust port 14 and the scavenge port 15 are shifted from each other by approximately 90 degrees.

The piston 2 is connected to one end of a connecting rod 7 and accommodated in a cylinder 8 of the cylinder body 3 in such a way that the piston 2 can slide along the axial direction of the cylinder 8. Ring groove portions 10 are provided in a tubular portion 9 of the piston 2, and an annular piston ring fits into each of the ring groove portions 10 and is in contact with the wall of the cylinder 8 to enhance airtightness between the space in the cylinder body 3 on the side where a combustion chamber 11, which will be described later, is present and an air-fuel mixture in the cylinder body 3 on the side where a crankcase 12 is present and prevent compressed gas from leaking. The piston ring is omitted in FIGS. 1A and 1B.

The combustion chamber 11, where the air-fuel mixture is burned, is disposed above the cylinder 8. An ignition plug 13 is provided in the combustion chamber 11, and the air-fuel mixture having flown into the combustion chamber 11 is burned with sparks produced by the ignition plug 13.

The crankcase 12 is disposed below the cylinder 8. A crankshaft 16 is rotatably accommodated in the crankcase 12. The other end of the connecting rod 7 is connected to a pin 17 of the crankshaft 16.

The exhaust port 14, through which combustion gas produced in the combustion chamber 11 passes and is discharged out of the cylinder body 3, is disposed in the vicinity of the combustion chamber 11. An exhaust tube (not shown) is connected to the exhaust port 14. The exhaust port 14 is disposed in a position where it is blocked by the tubular portion 9 of the piston 2 when the piston 2 reaches a top dead center (upper limit) and where the opening of the exhaust port 14 is exposed to the space on the side where the combustion chamber 11 is present earlier than the opening of the scavenge port 15, which will be described later, is exposed when the piston 2 descends. As a result, the combustion gas produced in the combustion chamber is exhausted through the exhaust port 14 and the exhaust tube into the atmosphere.

The intake port 19, through which an air-fuel mixture 18 obtained by mixing the composite fuel atomized in the carburetor 5 with the air sucked by the air cleaner 6 flows into the crankcase 12, is disposed below the exhaust port 14 in the cylinder 8. The intake port 19 is connected to one end of an intake tube 20, the other end of which is connected to the carburetor 5. In this configuration, the air sucked by the air cleaner 6 is mixed with the composite fuel in the carburetor 5, and the air-fuel mixture 18 formed of the air and the composite fuel flows into the crankcase 12. The air-fuel mixture 18 temporarily flows into the cylinder 8 before flowing into the crankcase 12. That is, the intake port 19 also serves as a port through which the air-fuel mixture flows into the cylinder 8.

The scavenge port 15, through which the space on the side where the crankcase 12 is present communicates with the space on the side where the combustion chamber 11 is present and which extends along a path different from the cylinder 8, is disposed in the cylinder body 3. The opening of the scavenge port 15 on the side where the combustion chamber 11 is present is disposed below the exhaust port 14 but above the intake port 19 in the cylinder 8. The scavenge port 15 allows the air-fuel mixture 18 in the crankcase 12 to flow into the area in the cylinder 8 that is on the side where the combustion chamber 11 is present, and the air-fuel mixture 18 then flows into the combustion chamber 11 disposed next to the cylinder 8. That is, the scavenge port 15 also serves as a port through which the air-fuel mixture flows into the cylinder 8.

The piston will now be described with reference to FIGS. 2 and 3.

Figure 2:
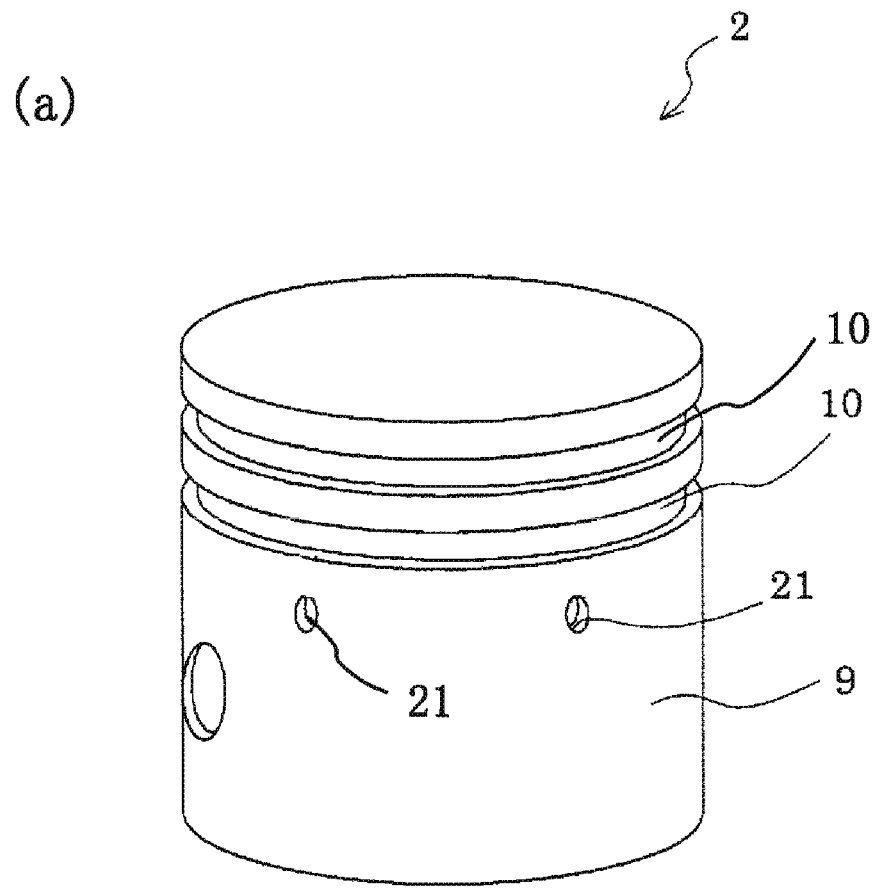
FIG. 2(a) is an exterior perspective view of a piston 2 having through holes 21 provided therein according to the first embodiment of the present invention viewed in an obliquely downward direction.
FIG. 2(b) is a cross-sectional view of the piston 2 taken along a plane including one of the through holes 21.
Figure 2:
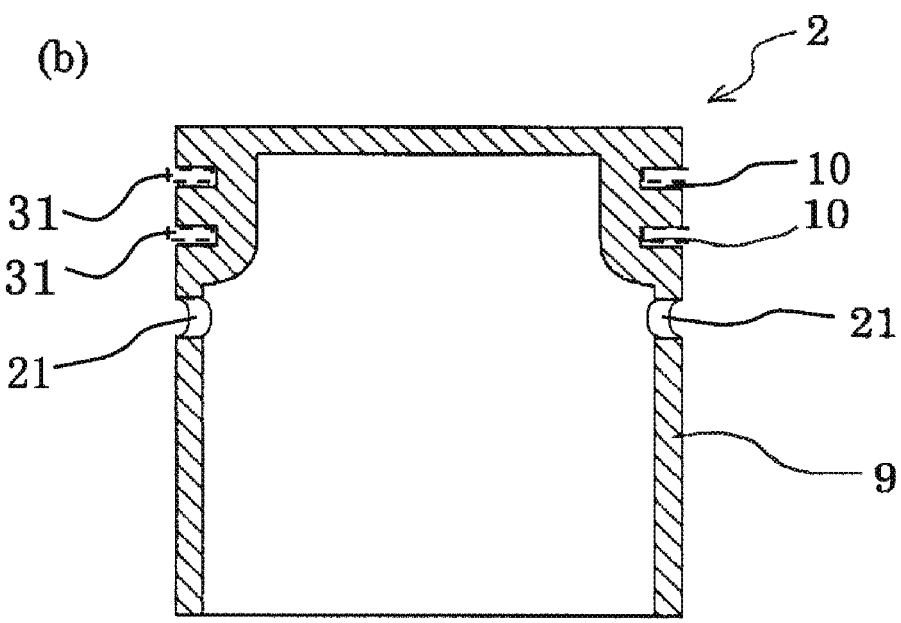

FIG. 2(*a*) is an exterior perspective view of the piston 2 having through holes 21 provided therein according to an embodiment of the present application viewed in an obliquely downward direction, and FIG. 2(*b*) is a cross-sectional view of the piston 2 taken along a plane including one of the through holes 21.

As shown in FIGS. 2(*a*) and 2(*b*), each of the through holes 21 is drilled through the tubular portion 9 of the piston 2 of the present embodiment. In the piston 2 of the present embodiment, each of the through holes 21 has a constant diameter from the outer surface of the tubular portion 9 to the inner surface thereof. Each of the through holes 21 is disposed in a position which faces the inner wall of the cylinder 8 but where the exhaust port 14, the scavenge port 15, and the intake port 19 in the two-cycle engine 1 are not present, specifically, in a position spaced apart from these ports (the exhaust port 14, the scavenge port 15, and the intake port 19) in the circumferential direction when the piston 2 is assembled in the two-cycle engine 1. Any number of through holes 21 may be provided as long as the strength of the piston 2 stays in an acceptable range.

That is, each of the through holes 21 is a hole or a cutout passing through the piston 2, and the diameter and the shape of the through hole 21 are not limited to specific ones (for example, circular, elliptical, or rectangular, or straight or tapered (for example, including a shape whose diameter gradually decreases from inside to outside), or straight or stepped, or any other shapes that allow the through hole to pass through the piston 2) and the number of and the spacings between through holes 21 are not limited to specific values. The through holes 21 are, however, preferably not inclined or tapered but disposed at substantially equal spacings. On the other hand, the position where the through hole 21 is drilled is not limited to a specific position but is preferably drilled in a position that does not overlap with the path extending from any of the exhaust port 14, the scavenge port 15, and the intake port 19.

In detail, providing the through holes 21 in the ring groove portions 10, although not shown, is not preferred because it may cause leakage of the compressed gas in the vicinity of the piston rings, resulting in a situation where the engine cannot starts, and may also cause failure in the material of the piston depending on the wall thickness thereof. Further, since it is difficult in terms of manufacturing technique to provide each of the through holes 21 in such a way that it extends from the lower surface (not shown) of any of the ring groove portions 10 in an inclined direction, it is not preferable to provide a through hole 21 in a piston having a small diameter. The through holes 21 may, however, be drilled or otherwise machined in the positions described above as long as means for solving the problems described above is separately provided. Further, only one through hole 21 provided in a predetermined position is not preferable because the amount of air-fuel mixture to be supplied to the sliding surfaces is insufficient. It is therefore desirable to provide a plurality of through holes 21, but a single through hole may provide a desired effect in some cases without degradation in lubrication performance depending on the diameter of the hole. In summary, to achieve a desired effect, it is necessary to provide a through hole 21 having an appropriate diameter and shape or in some cases provide an appropriate number of through holes 21 at appropriate spacings.

Figure 3:
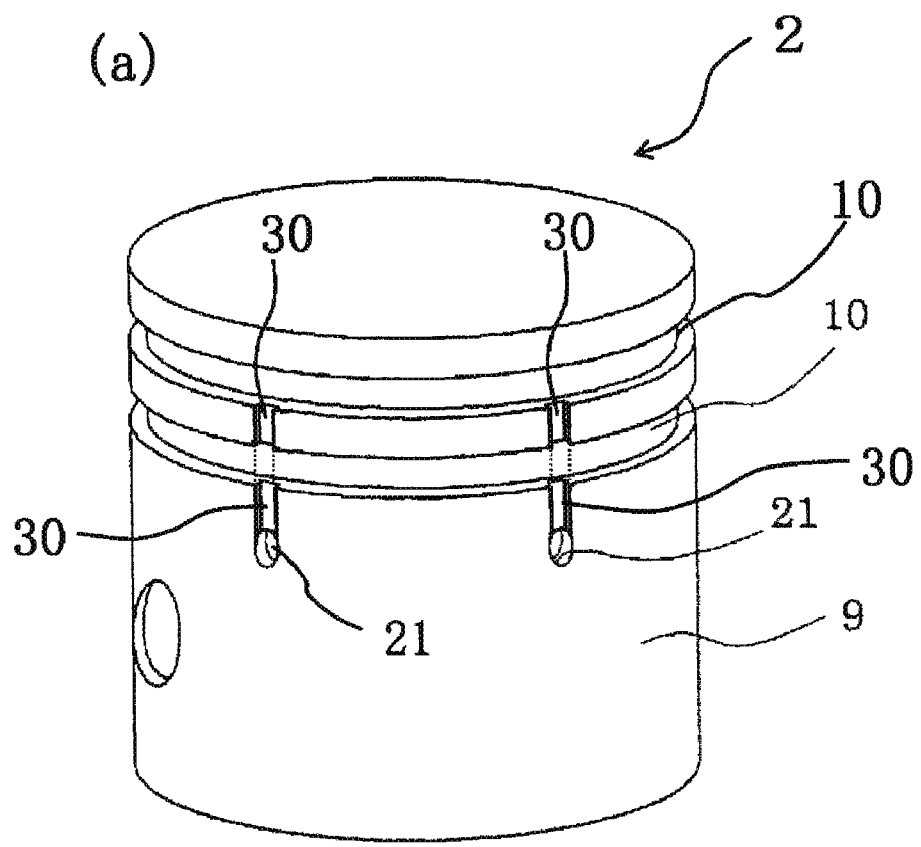
FIG. 3(a) is an exterior perspective view of a piston 2 having through holes 21 and groove portions 30 provided therein according to the first embodiment of the present invention viewed in an obliquely downward direction.
FIG. 3(b) is a cross-sectional view of the piston 2 taken along a plane including one of the through holes 21 and the corresponding groove portion 30.
Figure 3:
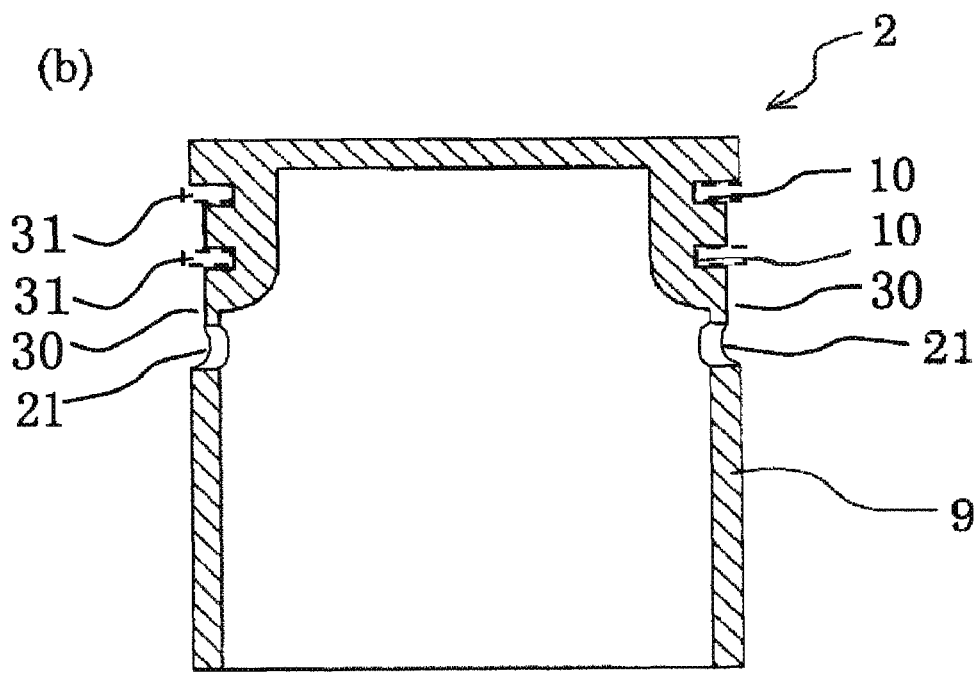

FIG. 3(*a*) is an exterior view of a piston 2 having through holes 21 and groove portions 30 provided therein according to another embodiment of the present application viewed in an obliquely downward direction, and FIG. 3(*b*) is a cross-sectional view of the piston 2 taken along a plane including one of the through holes 21 and the corresponding groove portion 30.

In the aspect shown in FIGS. 3(*a*) and 3(*b*), the groove portions 30 are provided above the respective through holes 21 and directly connected to the ring groove portions 10. The depth of each of the groove portions 30 is not limited to a specific value but is preferably shallower (smaller) than the depth of each of the ring groove portions 10, as shown in FIG. 3(*b*). Specifically, when the depth of each of the ring groove portions 10 is 1 mm, for example, the depth of each of the groove portions 30 is preferably smaller than 1 mm, more preferably ranges from approximately 0.5 to 0.8 mm. The reason for this is that it is preferable to minimize the area of the lower surface of each of the ring groove portions 10 with which the corresponding piston ring 31, indicated by the dotted-lines, does not come into contact and maximize the area of the lower surface of the ring groove portion 10. Further, the number of groove portions 30 is not limited to a specific value, but the groove portion 30 is preferably provided above each of the through holes 21.

In the two-cycle engine 1 described above, the air-fuel mixture 18 present in the combustion chamber 11 is compressed when the piston 2 ascends. At this point, the opening of the intake port 19 is exposed to the space on the side where the crankcase 12 is present, and a new volume of air-fuel mixture 18 flows through the intake port 19 into the crankcase 12. When the piston 2 reaches the top dead center (upper limit), the ignition plug 13 provided in the combustion chamber 11 produces sparks. The sparks cause the air-fuel mixture 18 in the combustion chamber 11 to explode and expand, and the expansion force of the combustion gas produced when the air-fuel mixture 18 is burned lowers the piston 2.

When the piston 2 descends and the opening of the exhaust port 14 is exposed to the space on the side where the combustion chamber 11 is present, the combustion gas is discharged out of the cylinder body 3 through the exhaust port 14. The air-fuel mixture 18 in the crankcase 12 is compressed by the piston 2 having descended. When the piston 2 further descends and the opening of the scavenge port 15 on the side where the combustion chamber 11 is present is exposed to the space on the side where the combustion chamber 11 is present, the air-fuel mixture in the crankcase flows into the space on the side where the combustion chamber 11 is present, which communicates with the space on the side where the crankcase 12 is present through the scavenge port 15, and the combustion gas left in the space on the side where the combustion chamber 11 is present is pushed through the exhaust port 14 and discharged out of the cylinder body 3. In this way, the space on the side where the combustion chamber 11 is present is filled with the air-fuel mixture 18 before combustion. The piston 2 having reached the bottom dead center (lower limit) starts ascending and goes through again the compression, combustion, expansion, and exhaust (intake) processes. That is, the following actions are carried out in the actual engine: the air-fuel mixture starts being compressed from the point when the lower end of the descending piston 2 reaches the lower end of the intake port 19; the air-fuel mixture passes through the gap between the facing surfaces of the piston rings and the piston ring portions; the exhaust gas is discharged through the exhaust port 14; and the compression is maximized immediately before the air-fuel mixture comes out of the scavenge port 15.

The flow of the air-fuel mixture 18 will next be described with reference to FIGS. 4A, 4B, 4C, and 4D.

Figure 4A:
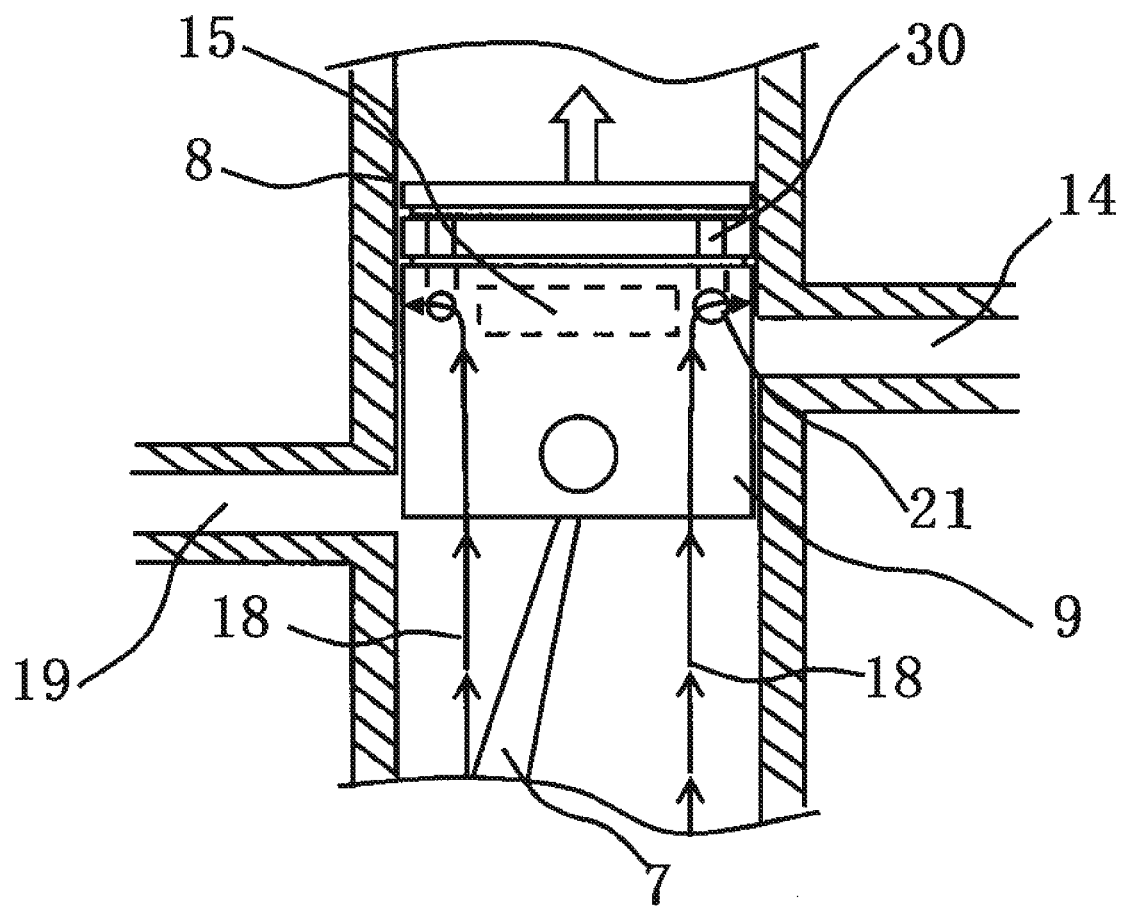
FIG. 4A is a schematic view showing the flow of an air-fuel mixture 18 during ascending motion of the piston 2 according to the first embodiment of the present invention.

FIG. 4A is a schematic view showing the flow of the air-fuel mixture 18 during ascending motion of the piston 2. As shown in FIG. 4A, when a series of members are operated when the two-cycle engine 1 described above is in operation, the air-fuel mixture 18 in the space in the crankcase 12 ascends as the crankshaft 16 rotates, enters the piston 2, passes through the through holes 21, and spreads over the inner wall of the cylinder 8. That is, the through holes 21 provided in the piston 2 function as supply means for supplying the air-fuel mixture to the interface between the inner wall of the cylinder 8 and the tubular portion 9 of the piston 2, and the air-fuel mixture is intentionally supplied to the sliding surfaces of the cylinder 8 and the piston 2 automatically in response to the driven piston 2. In this way, the sliding surfaces of the cylinder 8 and the piston 2 can be lubricated in a satisfactory manner, and seizure between the sliding surfaces of the cylinder 8 and the piston 2 can be suppressed.

Figure 4B:
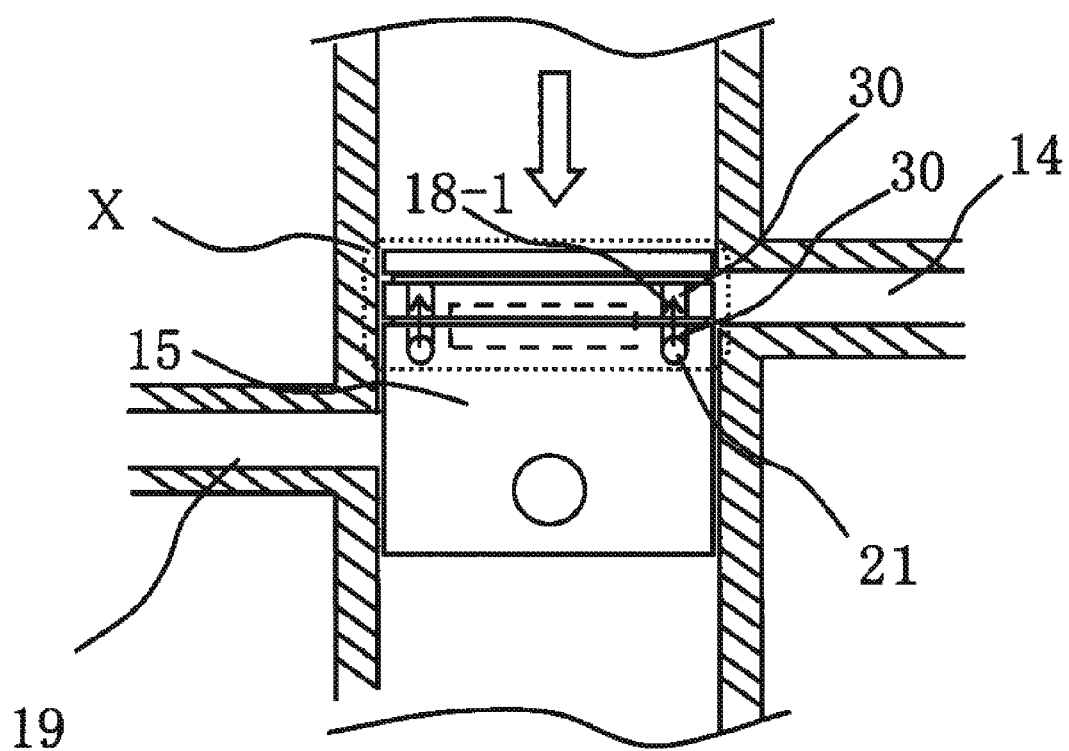
FIG. 4B is a schematic view showing a flow path of a lubricating oil 18-1 contained in the air-fuel mixture 18 during descending motion of the piston 2 according to the first embodiment of the present invention.

FIG. 4B is a schematic view showing a flow path of the lubricating oil 18-1 contained in the air-fuel mixture 18 during descending motion of the piston 2. As shown in FIG. 4B, after the piston 2 reaches the upper limit, the air-fuel mixture 18 in the combustion chamber 11 explodes and expands. When the air-fuel mixture 18 is burned and the expansion force of the combustion gas lowers the piston 2, the lubricating oil 18-1 contained in the air-fuel mixture 18 discharged through the through holes 21 by the pushing expansion force of the combustion gas emerges in the groove portions 30 through the through holes 21. (Extra) part of the lubricating oil 18-1 that has not spread over the sliding surfaces is held in the groove portions 30. The reason for this is that the lubricating oil 18-1 receives a force oriented in the direction of the expansion force of the combustion gas while the piston 2 descends at high speed, whereby the lubricating oil 18-1 is held in the groove portions 30, which are recessed from the sliding surface. After the lower surface of the ring groove portion 10 directly connected to the groove portions 30 located above the through holes 21 (hereinafter also referred to as a "first ring groove portion 10") passes by the inner lower end of the exhaust port 14, but before the first ring groove portion 10 reaches the inner upper end of the scavenge port 15, the portion in the vicinity of the piston rings is sealed and the air-fuel mixture is compressed, whereby the air-fuel mixture spreads over the largest area of the sliding surfaces during the period described above.

Figure 4C:
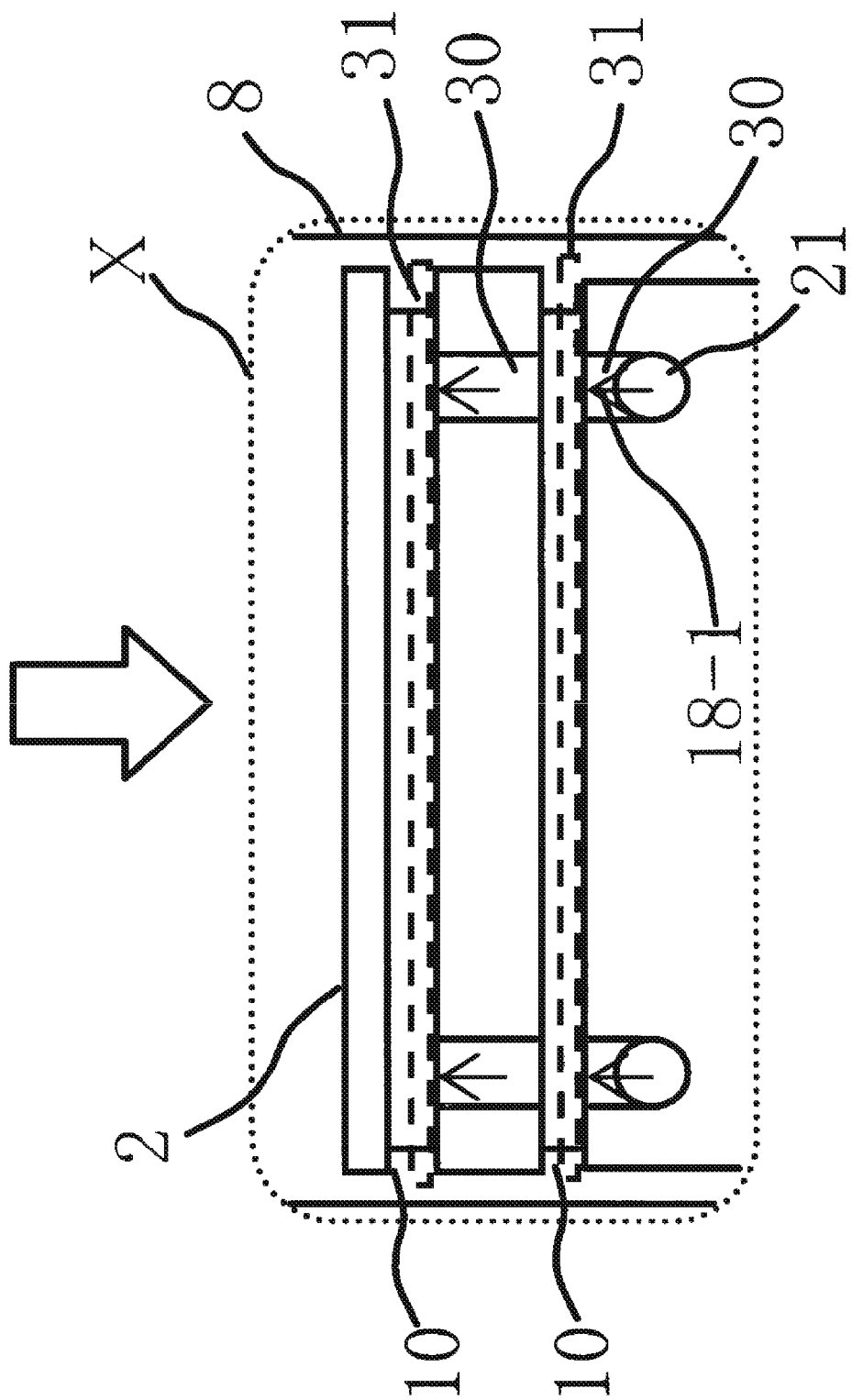
FIG. 4C is an enlarged view of the portion X shown in FIG. 4B and shows the relationship between the behavior of piston rings 31 and the flow path of the lubricating oil 18-1 immediately after the start of descending motion of the piston 2 according to the first embodiment of the present invention.

FIG. 4C is an enlarged view of the portion X shown in FIG. 4B and shows the relationship between the behavior of the piston rings 31 and the flow path of the lubricating oil 18-1 immediately after the start of descending motion of the piston 2. As shown in FIG. 4C, since each of the piston rings 31 is in contact with the lower surface of the corresponding ring groove portion 10 at this point, the lubricating oil 18-1 cannot flow into the ring groove portions 10. On the other hand, FIG.

Figure 4D:
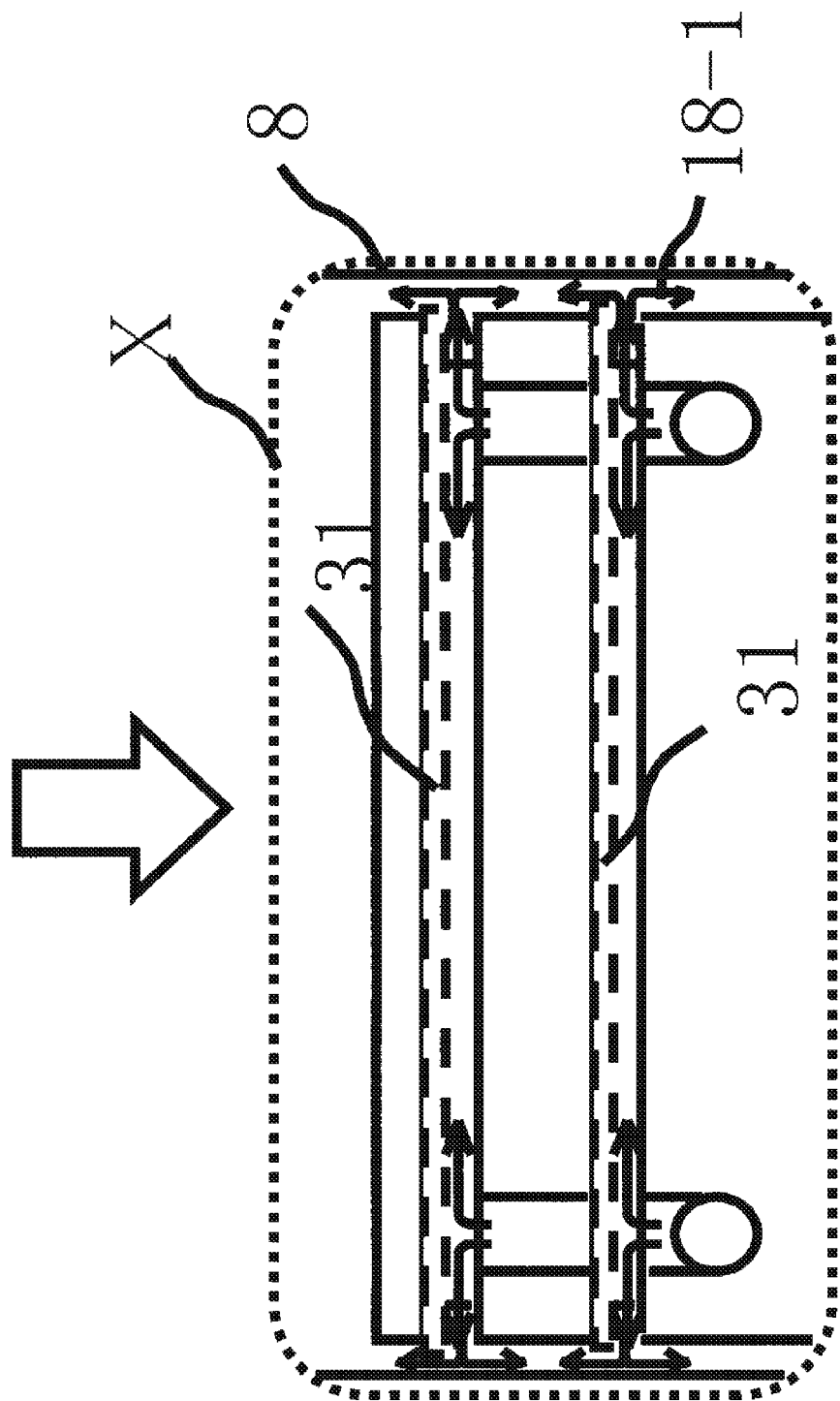
FIG. 4D is an enlarged view of the portion X shown in FIG. 4B and shows the relationship between the behavior of the piston rings 31 and the flow path of the lubricating oil 18-1 after a predetermined period has elapsed in the descending motion of the piston 2 according to the first embodiment of the present invention.

4D is an enlarged view of the portion X shown in FIG. 4B and shows the relationship between the behavior of the piston rings 31 and the flow path of the lubricating oil 18-1 after a predetermined period has elapsed in the descending motion of the piston 2. As shown in FIG. 4D, since each of the piston rings 31 having been pushed by the pressure of the exhaust gas and in contact with the lower surface of the corresponding ring groove portion 10 moves to (comes into contact with) the upper surface of the ring groove portion 10 as the piston 2 descends, a gap is created above the lower surface of each of the ring groove portions 10, and the lubricating oil 18-1 is supplied into the ring groove portions 10 via the ring groove portions 30. The lubricating oil 18-1 is therefore supplied to the sliding surface of the cylinder 8 via the ring groove portions 10, whereby the air-fuel mixture can be supplied to the sliding surfaces in a significantly satisfactory, reliable, and efficient manner without decrease in the speed and efficiency at which the piston is driven.

According to the thus configured two-cycle engine 1 and piston 2 of the present embodiment, the through holes 21 allow the air-fuel mixture to be intentionally supplied to the sliding surfaces of the cylinder 8 and the piston 2. That is, when a composite fuel having the same proportion of lubricating oil as that in a composite fuel of related art is used, reduction in the proportion of the lubricating oil supplied to the sliding surfaces of the cylinder 8 and the piston 2 per unit time can be greater than that in a conventional configuration. The reason for this is that the reduction still allows lubricating oil sufficient enough not to cause seizure to be supplied to the sliding surfaces of the cylinder and the piston. Therefore, according to the present embodiment, the cost of the lubricating oil can be greatly reduced as compared with that in related art.

The ratio between gasoline and a commercially available, inexpensive lubricating oil must range from 20:1 to 25:1 in a conventional configuration. However, in an experiment the present inventor has actually conducted based on the present embodiment, specifically, the two-cycle engine 1 with the piston 2 having a diameter and a height of approximately 32 mm and the through holes 21 having a diameter of approximately 4 mm, it has been ascertained that the sliding surfaces of the cylinder and the piston do not seize but can work in a satisfactory manner even when the ratio between the gasoline and the lubricating oil is 120:1.

In general, a lubricating oil contains a variety of additives for enhancing the lubrication performance, and a relatively large amount of toxic exhaust gas is produced when a lubricating oil of this type is burned in a two-cycle engine having a conventional configuration.

In this regard, the present embodiment allows the ratio of a lubricating oil to a composite fuel to decrease, whereby the amount of lubricating oil that enters the combustion chamber 11 and is burned with the fuel decreases accordingly. Therefore, the amount of produced exhaust gas toxic to humans and environments can also be reduced.

Each of the through holes 21 in the piston 2 of the present embodiment is provided in a position which faces the inner wall of the cylinder 8 but where the exhaust port 14, through which the combustion gas produced in the combustion chamber 11 is exhausted, is not present, whereby when the piston 2 slides along the inner wall of the cylinder 8, no unburned air-fuel mixture will be directly exhausted through the through holes 21 to the exhaust port 14.

Further, each of the through holes 21 in the piston 2 of the present embodiment is provided in a position which faces the inner wall of the cylinder 8 but where the port through which the air-fuel mixture flows into the cylinder 8 is not present, specifically, in a position which faces the inner wall of the cylinder 8 but where the intake port 19 and the scavenge port 15 are not present. The configuration described above reliably prevents gas leakage in which air-fuel mixture 18 leaks through the ports described above.

According to the present embodiment, the ratio of a lubricating oil to a composite fuel can be reduced, whereby the amount of lubricating oil that enters of the combustion chamber 11 decreases accordingly. Therefore, even when a conventional, typically commercially available lubricating oil is used, an event called "covering" in which carbon produced in a combustion process attaches to the ignition plus 13 unlikely occurs, and it is possible to prevent situations in which carbon accumulated on the muffler and the exhaust port, through which the combustion gas is exhausted, causes the speed of the engine not to increase or the engine to malfunction (although an instruction manual issued by a certain manufacturer states "Disassemble the muffler every 100 hours of driving and remove carbon," implementing the present invention saves the user the inconvenience described above and reduces the maintenance period).

An embodiment of the present invention has been described above, but the configuration of the present invention is not limited thereto. That is, the above embodiment has been described with reference to the case where the through holes 21 or the groove portions 30 provided in the tubular portion 9 of the piston 2 serve as supply means for supplying the air-fuel mixture to the sliding surfaces of the cylinder and the piston. The supply means is not limited to those described above but can be any means having a function of supplying the air-fuel mixture to the sliding surfaces of the cylinder and the piston.

The above embodiment has been described with reference to the configuration using a composite fuel obtained by mixing a fuel with a lubricating oil in advance. The present invention is not limited to the configuration described above but will provide the same advantageous effect also in a two-cycle engine having a configuration in which a fuel and a lubricating oil flow separately into the crankcase 12.

Further, the value of the present invention described in the specification does not depreciate at all even when a product produced by using the present invention described in the specification and/or a method provided based thereon is used in a secondary product and commercialized.

The technical principle on which the engine and the piston according to the present invention rely is inherently applicable to not only a mower and a chain saw but also an automobile equipped with a four-cycle engine, including a gasoline-powered vehicle and a diesel vehicle, and a motorcycle and any other small-sized machine equipped with a two-cycle engine.

An environmentally friendly vehicle using a gasoline or diesel engine also fully relies on a normal compression process in an engine. In a vehicle equipped with an engine using a fossil fuel, the one and only method left for greatly improving the fuel consumption is increasing the thermal efficiency (that is, the ratio of extracted power to the energy obtained when a fixed amount of fuel is burned), and the best environmental protection measure is providing a small engine capable of maximizing the compression ratio and the torque. In related art, an engine having a larger displacement is used to output greater power, but increase in size of the engine disadvantageously results in significant increase in space necessary to incorporate the engine, which increases the weight and hence the amount of consumed fuel or the fuel consumption.

At present, the thermal efficiency of a gasoline-powered vehicle ranges from 14 to 20%, whereas the thermal efficiency of a diesel vehicle ranges from 38 to 40%. The remainder is all converted into heat or discharged in the form of exhaust gas. Assuming that gasoline costs 100 yen per liter, extracted power corresponds to 20 yen at maximum, whereas the remaining 80 yen becomes heat and exhaust gas at present. It is therefore conceivable that improvement in thermal efficiency can reduce the current fuel cost by a factor of three to four. Further, when the compression ratio in an engine is increased by a factor of 1.5, the torque is increased at least by a factor of 2. When the compression ratio is high, for example, knocking occurs in some cases in a gasoline-powered vehicle provided that the octane number of gasoline is the same. On the other hand, in a diesel vehicle, there arise problems, such as an increased level of diesel knocking, which has, however, been solved by using a method for injecting a fuel directly into the combustion chamber, a piezoelectric injector that instantly and finely controls the amount of fuel, and a common rail method.

On the other hand, when the compression ratio is increased by a factor of 1.5, a compressive force greater by a factor of approximately 1.5 than that in related art presses a piston ring in an engine from the inside of the piston toward the surface of the cylinder or the cylinder liner. In this case, the advantageous effect achieved by formation of an oil film on the sliding surfaces is further greatly enhanced. If the cylinder liner or the cylinder has worn, the piston ring has also worn in many cases. In this case, the gap between the facing surfaces of the piston ring is further increased, and the amount of heated combustion gas that blows into the crankcase of the engine increases.

The heated, blow-by combustion gas degrades the engine oil in the crankcase and converts part thereof into lamp black. When the increased amount of blow-by gas (combustion gas that has blown into the crankcase) is transported toward the intake port of the engine, the inside of the engine becomes sticky due to the oil. Further, when the piston moves toward the bottom dead center and reaches the lowest position, the engine oil is lifted by the crankshaft of the engine toward the piston, passes through the worn cylinder liner and the enlarged gap between the facing surfaces of the piston ring, and ascends into the combustion chamber, resulting in further increase in oil consumption. Wear can therefore be a cause of the repeated vicious circle.

In summary, according to the present application, providing a variety of supply means for forming an oil film that suppresses seizure and wear of the sliding surfaces, specifically, providing through holes and/or groove portions in the piston, allows the composite ratio of a composite fuel to greatly decrease and the air-fuel mixture to be supplied to the sliding surfaces at all times so as to form an oil film. In this way, the thermal efficiency is improved and the fuel consumption is reduced. The technical principle of the present application eventually allows automobiles and motorcycles equipped with a four-cycle or two-cycle engine to be converted into environmentally friendly vehicles.

Further, the technical principle of the present application is applicable to not only environmentally friendly vehicles but also any vehicles using an engine as a drive source, for example, automobiles, boats, outboard engines, snowmobiles, and other machines, and vehicles, mowers, chain saws, and other industrial machines and tools designed to operate in low cold climate.

In the present application, the supply means intentionally supplies an engine oil to the interface between the cylinder/cylinder liner and the piston/piston rings of an engine so that an oil film is reliably and consistently kept being formed, whereby no friction occurs between objects facing each other, and the state of compression in the combustion chamber of a brand-new engine can be maintained permanently.

When the engine oil supply means is provided all over the lower surface of a piston ring in a four-cycle engine, the engine oil is kept being supplied adequately, automatically, and consistently to the periphery of the piston ring, the cylinder, and the cylinder liner because the reciprocating motion of the piston moves the slight gap at the piston ring before wear occurs, whereby an oil film is formed and hence wear can be minimized. Providing the engine oil supply means also eliminates a need for an expensive engine oil.

When a currently used engine is considered, it is difficult to prevent wear for a long period even when an expensive engine oil is used, which is obvious from the present situations. In many currently used engines, the consumption of engine oil increases when the mileage reaches approximately 100 thousands kilometers, and the engine wears so much that an engine oil level gauge does not reach the surface of the engine oil at all when the mileage reaches five thousands kilometers, which is considered to be the timing when the engine oil should be exchanged.

The compressive force in the combustion chamber of such a worn engine is always reduced by 1 to 2 kg as compared with a normal engine.

In a vehicle equipped with an engine designed to form an oil film according to an embodiment of the present invention, the cylinder liner, the piston, and the piston rings can be used with nearly no wear in a seven year long test under the same conditions as typical conditions.

Preventing wear of the piston and members therearound and maintaining the compressive force in the combustion chamber at an appropriate level allow an engine to readily and reliably start when it is cold and, after the engine starts, a stable speed and power (torque, in particular) to be maintained and prevent the fuel consumption from increasing irrespective of the coldness without increasing the amount of fuel and the amount of injection unlike in related art.

Industrial Applicability

According to the preset application, since the sliding surfaces of the cylinder or the cylinder liner and the piston and peripheral members thereof are lubricated in a satisfactory manner, and seizure between the sliding surfaces of the cylinder or the cylinder liner and the piston and peripheral members thereof can be suppressed, the present application is generally applicable to not only automobiles and motorcycles equipped with a four-cycle or two-cycle engine but also industrial machines, such as mowers and chain saws, which are one type of machine equipped with an engine.

Further, since the present application may cover those using an engine as a drive source, for example, automobiles, boats, outboard engines, snowmobiles, and the other machines and tools used in cold climate, the present application provides great availability and usefulness for a wide variety of applications in the current society including the automobile industries, the ship industries, the agriculture, the agricultural machinery industries, and the construction industries because the present application may involve not only domestic environmental issues but also the whole range of industries and may be a trigger of reviewing a novel drive source in the world.

The invention claimed is:

1. A piston of an engine in which an air-fuel mixture containing a lubricating oil is supplied into a combustion chamber, the piston comprising:

supply paths through which the air-fuel mixture is supplied to an interface between the piston and an inner wall of a cylinder or a cylinder liner, and grooves formed in a tubular portion, each of the grooves extending from an opening of a corresponding through hole that is located on the inner wall of the cylinder or the cylinder liner toward a piston ring and/or a piston ring portion.

2. The piston according to claim 1, wherein the supply paths are through holes that pass through the tubular portion.

3. A method for improving a piston accommodated in a cylinder body having an exhaust port, a scavenge port, and an intake port provided therein, the piston having a piston ring groove portion provided therein, the method comprising:

drilling through holes in a sidewall of the piston in positions shifted in the circumferential direction from at least one of the exhaust port, the scavenge port, and the intake port; and forming grooves in the sidewall of the piston in such a way that the grooves directly connect the respective through holes to the piston ring groove portion.

4. The method of improving a piston according to claim 3, the piston having a plurality of piston ring groove portions provided therein, the method further comprising:

drilling through holes in a sidewall of the piston in positions shifted in the circumferential direction from at least one of the exhaust port, the scavenge port, and the intake port; and forming grooves in the sidewall of the piston in such away that the grooves directly connect the respective through holes to the plurality of piston ring groove portions and/or each of the piston ring groove portions to the adjacent piston ring groove portion.

5. The method for improving a piston according to claim 4, wherein a piston ring fits into the piston ring groove portions.

6. The method for improving a piston according to claim 3, wherein a piston ring fits into the piston ring groove portion.

* * * * *